US012002440B2

(12) United States Patent
Zhuang

(10) Patent No.: US 12,002,440 B2
(45) Date of Patent: Jun. 4, 2024

(54) SNARE ADJUSTMENT DEVICE FOR SNARE DRUM

(71) Applicant: K.H.S. MUSICAL INSTRUMENT CO., LTD., New Taipei (TW)

(72) Inventor: Yun-Ci Zhuang, New Taipei (TW)

(73) Assignee: K.H.S. MUSICAL INSTRUMENT CO., LTD., New Taipei (TW)

( * ) Notice: Subject to any disclaimer, the term of this patent is extended or adjusted under 35 U.S.C. 154(b) by 300 days.

(21) Appl. No.: 17/704,624

(22) Filed: Mar. 25, 2022

(65) Prior Publication Data

US 2023/0306933 A1 Sep. 28, 2023

(51) Int. Cl.
*G10D 13/18* (2020.01)
*G10D 13/02* (2020.01)

(52) U.S. Cl.
CPC ............. *G10D 13/18* (2020.02); *G10D 13/02* (2013.01)

(58) Field of Classification Search
CPC ............................... G10D 13/18; G10D 13/02
See application file for complete search history.

(56) References Cited

U.S. PATENT DOCUMENTS

| | | | | |
|---|---|---|---|---|
| 7,223,910 | B2 * | 5/2007 | Shimada | G10D 13/02 84/415 |
| 10,565,968 | B1 * | 2/2020 | Miyajima | G10D 13/18 |
| 10,692,477 | B1 * | 6/2020 | Wu | G10D 13/18 |
| 2009/0133564 | A1 * | 5/2009 | Miyajima | G10D 13/02 84/415 |
| 2023/0306933 | A1 * | 9/2023 | Zhuang | G10D 13/02 |

* cited by examiner

*Primary Examiner* — Robert W Horn
(74) *Attorney, Agent, or Firm* — Rabin & Berdo, P.C.

(57) ABSTRACT

A snare adjustment device includes a snare protection frame having snares connected thereto, a holding body, a slider slidably connected to the holding body and moving the snare protection frame and the snares along with it, a switch member, and a manual lever. The switch member includes a latch section movable by a push section to engage with or disengage from the slider, such that the slider is stopped from or allowed to move, respectively. The manual lever is pivotally connected to the holding body and can be swung up and down for moving the slider. The manual lever includes a lever section, which and the push section of the switch member are protruded beyond a reference side of the holding body. Therefore, a drum player can hit the push and the lever section with a drum stick to quickly switch the snares between a tightened and a loosened state.

7 Claims, 13 Drawing Sheets

SNARE ADJUSTMENT DEVICE FOR SNARE DRUM

FIELD OF THE INVENTION

The present invention relates to a snare adjustment device for snare drum, and more particularly, to a snare adjustment device that allows a snare drum player to switch the snares between a tightened and a loosened state conveniently and quickly during the process of playing.

BACKGROUND OF THE INVENTION

A snare drum is one of the most commonly seen percussion instruments. Please refer to FIGS. 1A to 1C. A conventional snare drum 1 mainly includes a drum body 10, a snare mechanism 11, a quick release mechanism 12, and a snare on/off mechanism 13. The drum body 10 includes a hollow shell 101 and two drumheads (not shown) separately connected to an upper and a lower end of the shell 101. The snare mechanism 11 includes a snare protection frame 111 located below the lower end of the shell 101 and a plurality of snares 112 respectively having two ends connected to the snare protection frame 111, so that the snares 112 are stretched across the lower head of the shell 101. The quick release mechanism 12 is provided between the shell 101 and the snare protection frame 111 to enable quick mounting and release of the snare mechanism 11 to and from the drum body 10. When the snare mechanism 11 is released from the drum body 10, a snare drum player can replace the snares 112 as necessary.

As shown in FIGS. 1B and 1C, the snare on/off mechanism 13 includes a holding body 131, a slider 132, and a switch member 133. The holding body 131 is connected to the shell 101. The slider 132 includes a vertically extended sliding stem 132*a* and two horizontally arranged sliding handles 132*b*. The sliding stem 132*a* is connected to the snare protection frame 111 of the snare mechanism 11, and the two sliding handles 132*b* are located at two opposite sides of the sliding stem 132*a*, i.e. the sliding stem 132*a* is located between the two sliding handles 132*b*. The slider 132 is movably mounted on the holding body 131, such that the slider 132 is movable linearly relative to the holding body 131 in the z-axis direction and the snare mechanism 11 is brought to move along with the slider 132 synchronously. As shown, when the slider 132 is movably mounted on the holding body 131, the two sliding handles 132*b* are extended in the y-axis direction to project beyond the holding body 131.

The switch member 133 is plugged into the holding body 131 in the x-axis direction, such that a part of the switch member 133, which is defined as a latch section 133*a*, is extended into the holding body 131, while the other part of the switch member 133, which is defined as a push section 133*b*, is located outside the holding body 131. The latch section 133*a* is freely movable in the holding body 131 in the x-axis direction to selectively engage with or disengage from the sliding stem 132*a* of the slider 132 for the slider 132 to be vertically unmovable or movable relative to the holding body 131, respectively. When a drum player wants to snare off or loosen the snare mechanism 11 while battering the conventional snare drum 1 with a drum stick, the drum player may push the switch member 133 in the x-axis direction to disengage the latch section 133*a* from the sliding stem 132*a*. At this point, the slider 132 moves downward in the z-axis direction under the force of gravity and renders the snares 112 loose. On the other hand, when the drum player wants to snare on or tighten the snare mechanism 11, the drum player may grip at the sliding handles 132*b* to thereby pull the slider 132 upward in the z-axis direction for the switch member 133 to engage with the sliding stem 132*a*. At this point, the snares 112 are changed from the loosened state into a tightened state.

With the above arrangements, the two sliding handles 132*b* of the slider 132 are separately located at a front and a rear side of the holding body 131 in the y-axis direction and the push section 133*b* of the switch member 133 is located at a right side of the holding body in the x-axis direction. That is, the two sliding handles 132*b* and the push section 133*b* are located at different sides of the holding body 131. When the drum player wants to change the state of the snares 112 by operating the sliding handles 132*b* or the push section 133*b* in the process of battering the conventional snare drum 1, the drum player needs to operate at different sides of the holding body 131, making it inconvenient to snare on or snare off the snare mechanism 11.

SUMMARY OF THE INVENTION

A primary object of the present invention is to provide a snare adjustment device with an improved structural configuration, so that a drum player playing a snare drum can conveniently snare on or snare off the snare adjustment device to quickly switch the snares between a tightened and a loosened state.

To achieve the above and other objects, the snare adjustment device for snare drum according to the present invention includes a snare mechanism and a snare on/off mechanism. The snare mechanism includes a snare protection frame and a plurality of snares. Every snare has two ends connected to two opposite ends of the snare protection frame.

The snare on/off mechanism mainly includes a holding body, a slider, a switch member, and a manual lever. The holding body is connected to a shell of the snare drum, and one side of the holding body located farther away from the shell is defined as a reference side. The slider is connected to the snare protection frame while being slidably connected to the holding body, such that the slider and the snares are movable relative to the holding body synchronously.

The switch member includes a latch section capable of stopping the slider from moving and a push section for driving the latch section to move between a blocking position and a releasing position. The latch section in the blocking position is engaged with the slider to stop the slider from moving relative to the holding body; and the latch section in the releasing position is disengaged from the blocking position to release the slider and allow the slider to move relative to the holding body. It is noted the push section is protruded beyond the reference side of the holding body.

The manual lever includes a coupling section connected to the slider, and a lever section and a pivot section separately extended from two axially opposite sides of the coupling section. The lever section is protruded beyond the reference side, such that both the lever section and the push section are located at the same side of the holding body. The pivot section is pivotally connected to the holding body, allowing the coupling section to bring the slider to move along with it when the lever section is swung relative to the holding body.

In a preferred embodiment, the holding body is formed with a sliding bore for accommodating the slider, and a notch communicable with the sliding bore. The notch is located corresponding to the coupling section of the manual lever, so that a part of the coupling section is movable between the sliding bore and the notch when the manual lever is swung.

A guide portion and a protruded pin extended into the guide portion are provided between the coupling section and the slider, and the protruded pin is movable in the guide portion when the lever section is swung relative to the holding body.

An area of the holding body corresponding to the notch forms a guiding surface and the lever section is tapered toward the coupling section, such that one side of the lever section facing toward the guiding surface on the holding body is formed into a lever guiding surface. The snare on/off mechanism is divided along the reference side into a holding zone and an operating zone. The holding body, the slider, the latch section of the switch member, the coupling section of the manual lever, and the pivot section of the manual lever all are located in the holding zone, while the push section of the switch member and the lever section of the manual lever are located in the operating zone.

A line extended horizontally through a center of the push section is defined as a horizontal centerline and a line extended vertically through a center of the lever section is defined as a vertical centerline. The horizontal centerline and the vertical centerline intersect with each other to define an intersection plane, such that the push section is out of sight below the lever section when viewing downward from a top of the snare on/off mechanism.

The holding body includes a fixed seat connected to the shell of the snare drum, a movable seat connected to the slider, and a tension adjusting element is provided between the fixed seat and the movable seat for moving the movable seat axially relative to the fixed seat, so that the tension of the snares are capable of adjustment by the tension adjusting element. And, the pivot section is slantingly connected to the coupling section, such that the coupling section is prevented from contacting with the tension adjusting element when the manual lever is being swung.

The present invention is characterized in that both of the push section of the switch member and the lever section of the manual lever are protruded beyond the reference side of the holding body. More specifically, the push section and the lever section are not only located outside the holding body, but also located at the same side of the holding body. With this arrangement, a drum player can hit the push section with a drum stick to snare off the snare adjustment device or hit the lever section with the drum stick to snare on the snare adjustment device, so as to quickly switch the snares between a tightened and a loosened state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and by referring to the accompanying drawings.

In the accompanying drawings, the positive and the negative direction of the x-axis indicate the right and the left side, respectively, of a performer playing the snare drum of the present invention when viewing in front of the drawings; the positive and the negative direction of the y-axis indicate the front and the rear side, respectively, of the performer playing the snare drum when viewing in front of the drawings; and the positive and the negative direction of the z-axis indicate the upper and the lower side, respectively, of the performer playing the snare drum when viewing in front of the drawings. Accordingly, in the specification of the present invention, the directional terms, such as “left”, “right”, “front”, “rear”, “upper” and “lower”, indicate the directions toward which the drum performer faces when playing the snare drum.

Figure 1A:
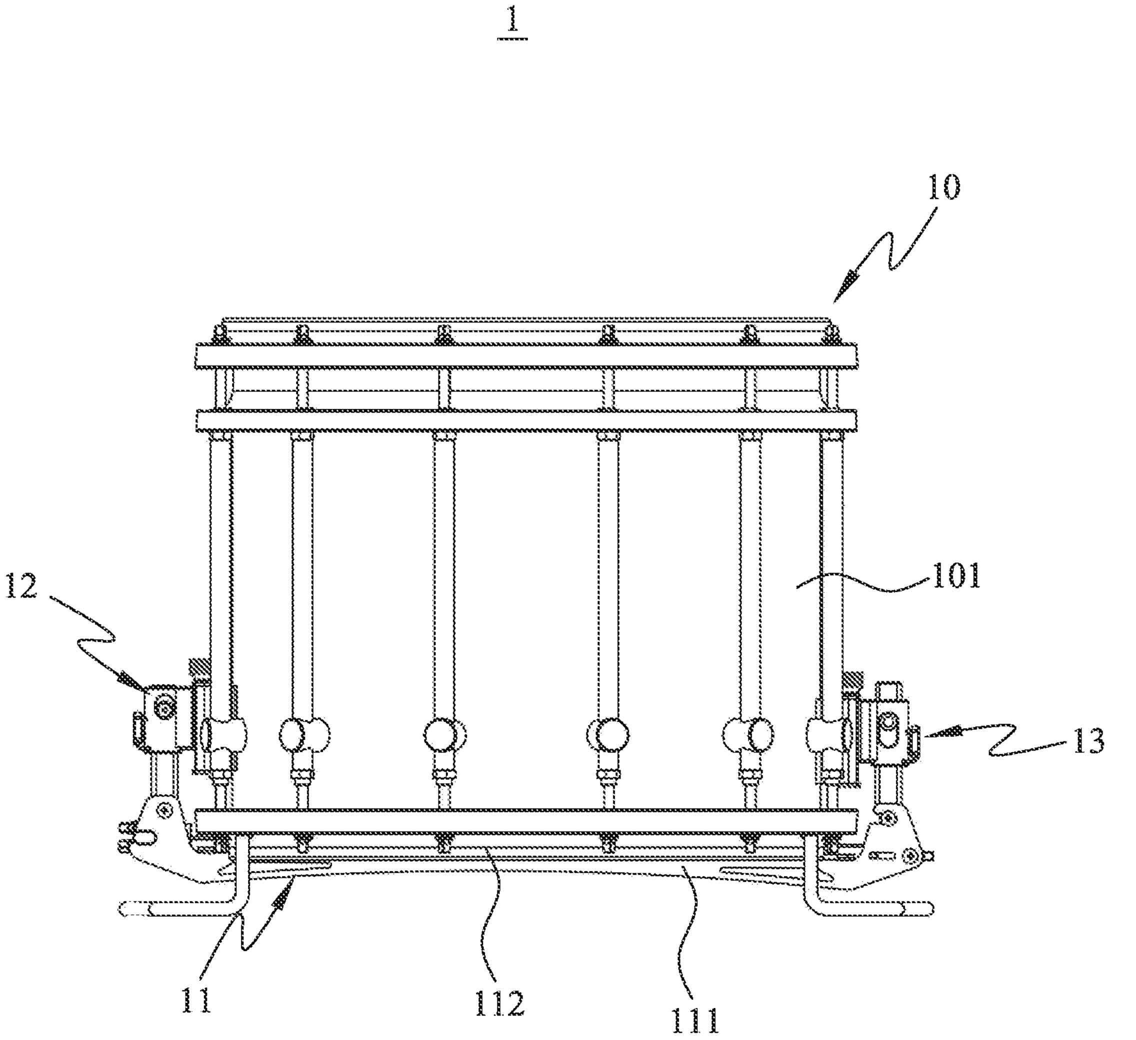
FIG. 1A (Prior Art)
FIG. 1A is a front perspective view of a conventional snare drum.
Figure 1B:
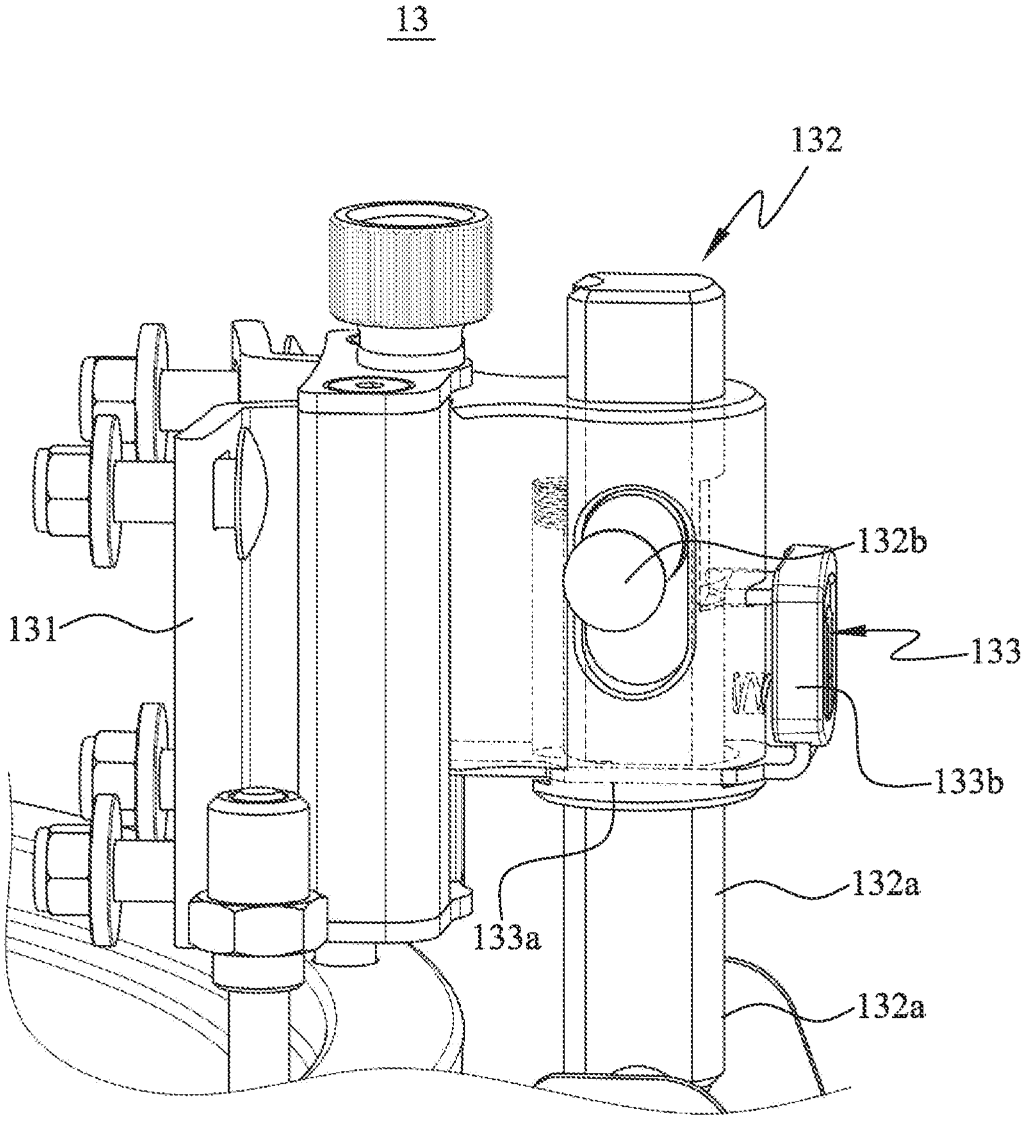
FIG. 1B (Prior Art)
FIG. 1B shows how a snare mechanism and a snare on/off mechanism of the conventional snare drum are connected to each other.
Figure 1C:
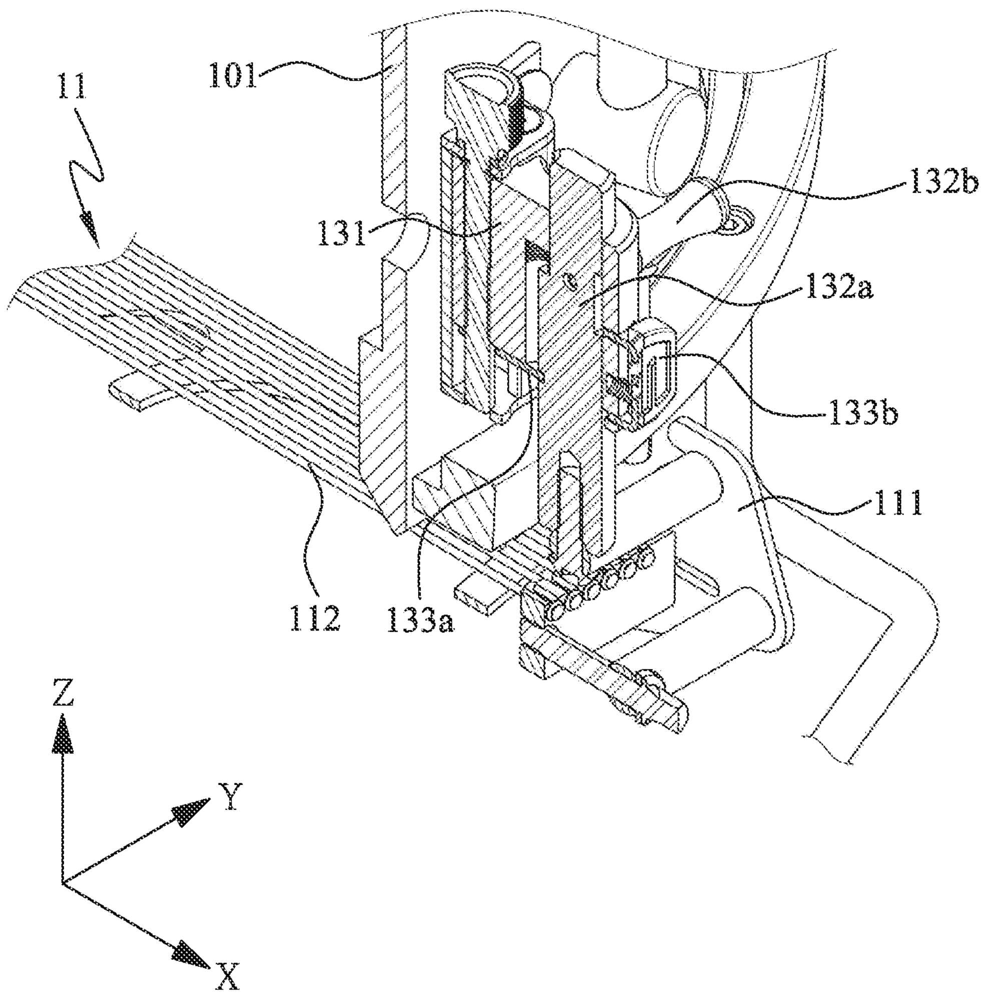
FIG. 1C (Prior Art)
FIG. 1C is a cutaway view of FIG. 1B.
Figure 2:
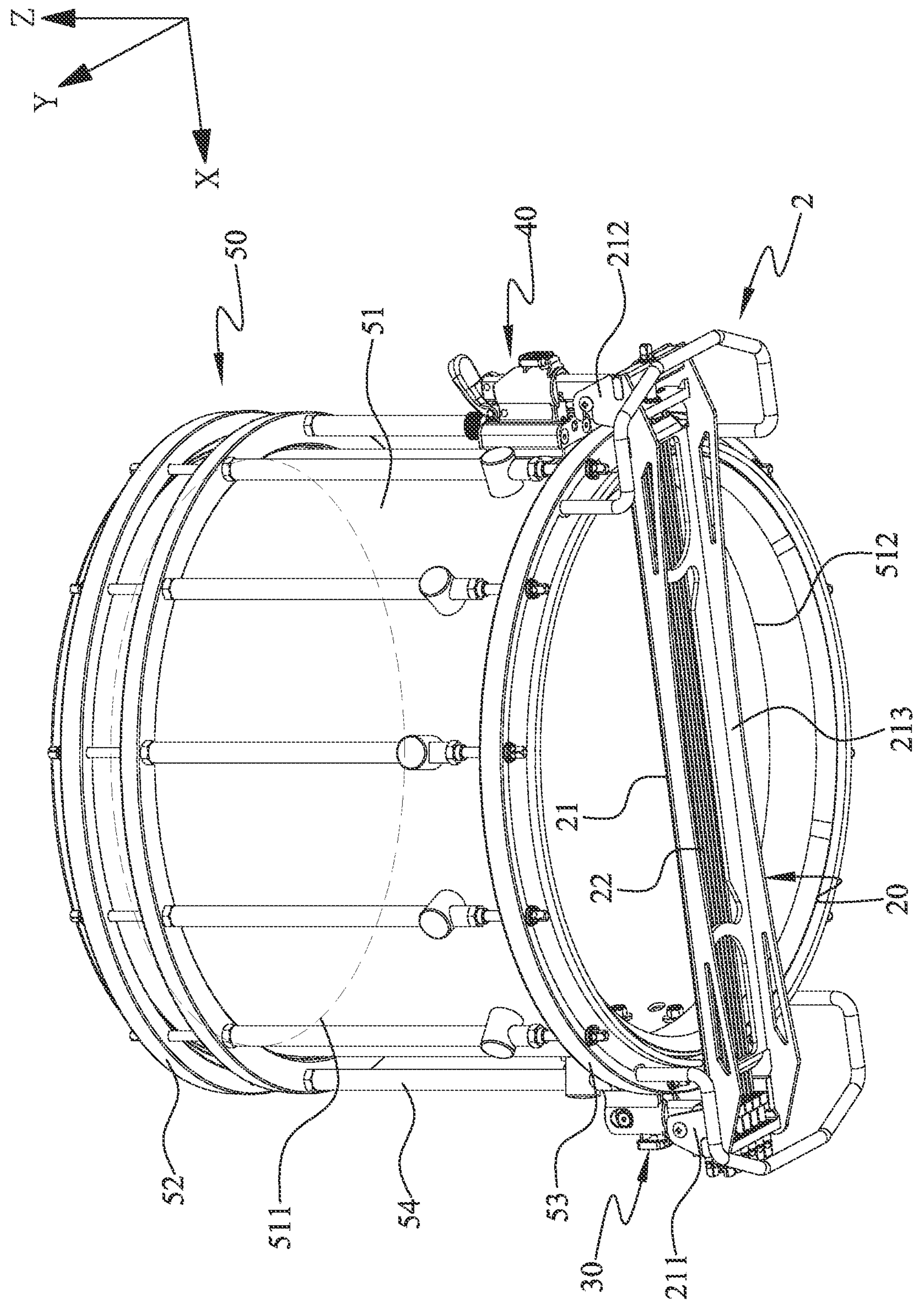
FIG. 2 is an assembled bottom perspective view showing a snare adjustment device according to the present invention is mounted to a snare drum.
Figure 3:
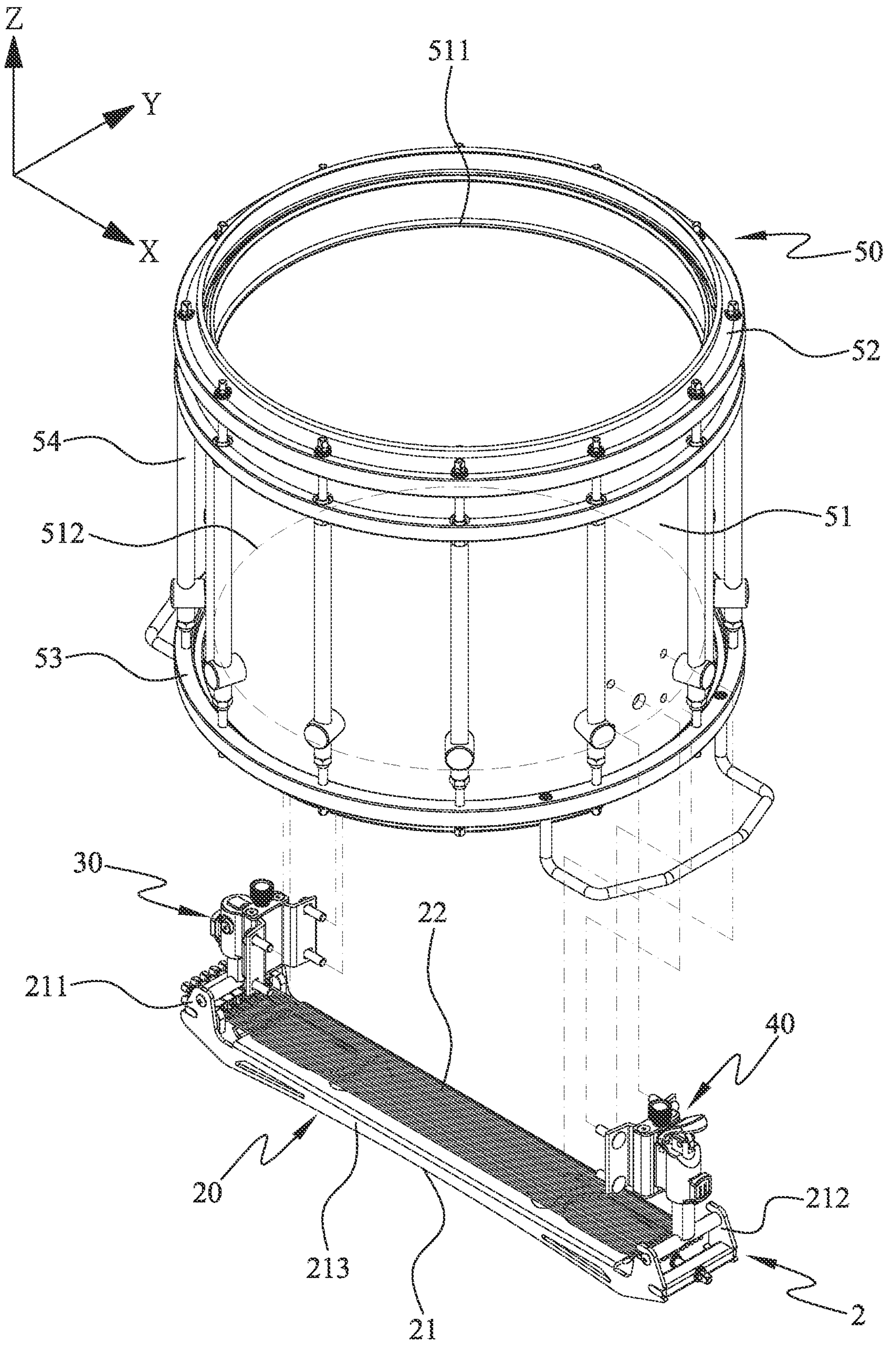
FIG. 3 is an exploded top perspective view showing the snare adjustment device according to the present invention and the snare drum of FIG. 2.

Please refer to FIGS. 2 and 3. The snare adjustment device provided according to the present invention is generally denoted by reference numeral 2 and is used with a snare drum 50. The snare adjustment device 2 mainly includes a snare mechanism 20, a quick release mechanism 30, and a snare on/off mechanism 40. As shown, the snare drum 50 includes a shell 51 in the form of a hollow barrel having two open ends, namely, a top opening 511 and a bottom opening 512 spaced from the top opening 511. The top and the bottom opening 511, 512 are communicable with an internal space of the shell 51. An upper counter-hoop 52 is provided around the top opening 511 of the shell 51 to clamp and tighten a batter head (not shown) over the top opening 511. Similarly, a lower counter-hoop 53 spaced from the upper counter-hoop 52 is provided around the bottom opening 512 to clamp and tighten a snare head (not shown) over the bottom opening 512. A plurality of tension rods 54 is spaced around an outer side of the shell 51 and located between the upper and the lower counter-hoop 52, 53 for adjusting the batter head and the snare head to desired tension.

Please refer to FIG. 3. The snare mechanism 20 is located below the snare head of the snare drum 50 and includes a snare protection frame 21 and a plurality of snares 22. Two longitudinally opposite ends of the snare protection frame 21 are configured into a left connecting section 211 of the snare protection frame 21 and a right connecting section 212 of the snare protection frame 21, and a portion of the snare protection frame 21 that is extended between the left and the right connecting section 211, 212 and located immediately below the snare head is an extending section 213 of the snare protection frame 21. The left connecting section 211 is connected to the quick release mechanism 30, and the right connecting section 212 is connected to the snare on/off mechanism 40. Every snare 22 has two longitudinally opposite ends separately connected to the left and the right connecting section 211, 212 of the snare protection frame 21, such that every snare 22 is located between the snare head and the extending section 213 of the snare protection frame 21. The quick release mechanism 30 is located between the shell 51 of the snare drum 50 and the left connecting section 211 of the snare protection frame 21 to allow quick mounting and quick releasing of the snare mechanism 20 to and from the shell 51. When the snare mechanism 20 is released from the shell 51, all the old snares 22 can be removed from the snare protection frame 21 and new snares 22 can be installed on the snare protection frame 21 to thereby achieve the purpose of replacing snares 22.

Figure 4:
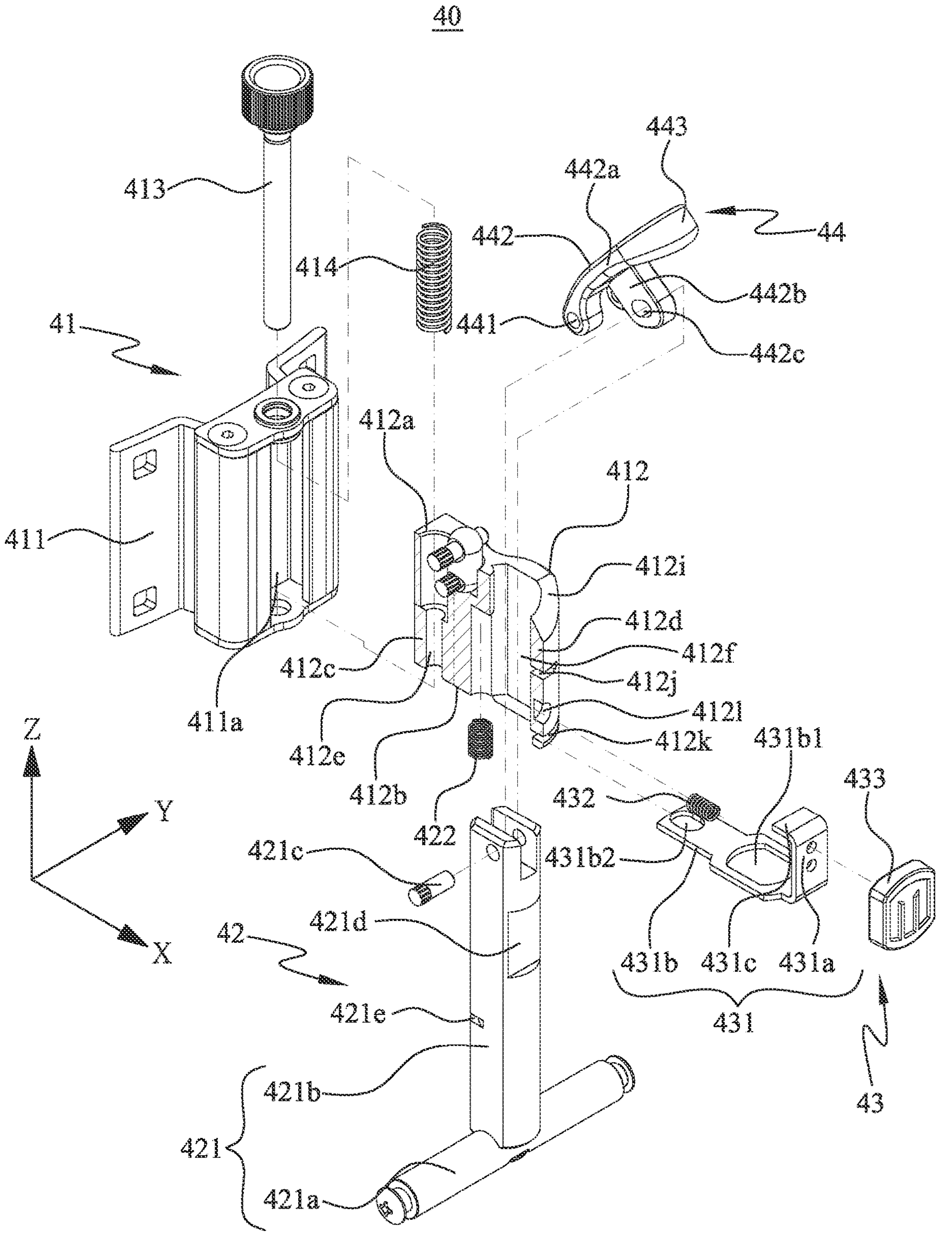
FIG. 4 is an enlarged, exploded perspective view of a snare on/off mechanism in FIG. 3.
Figure 5A:
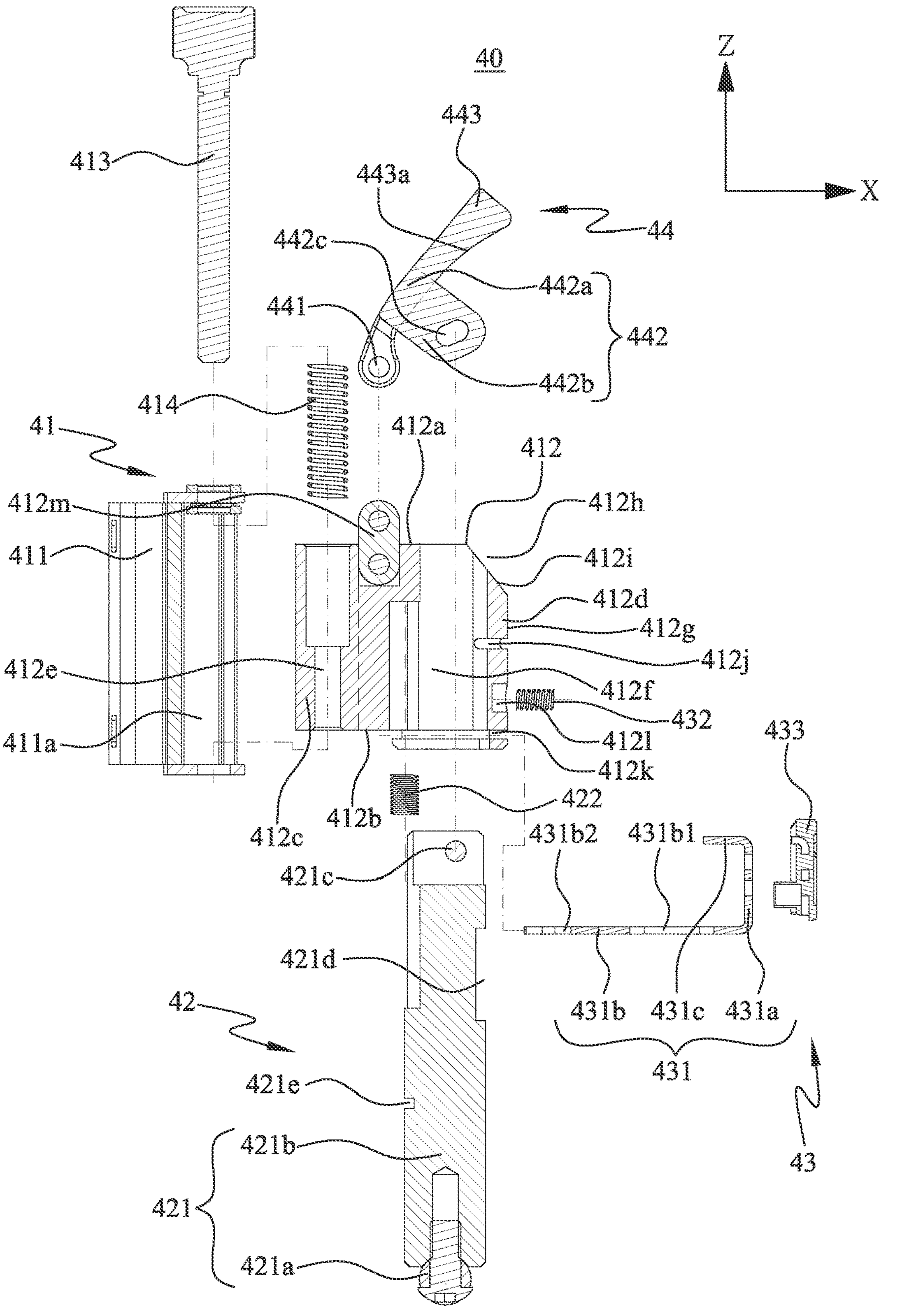
FIG. 5A is an exploded sectional view of the snare on/off mechanism of FIG. 4.
Figure 5B:
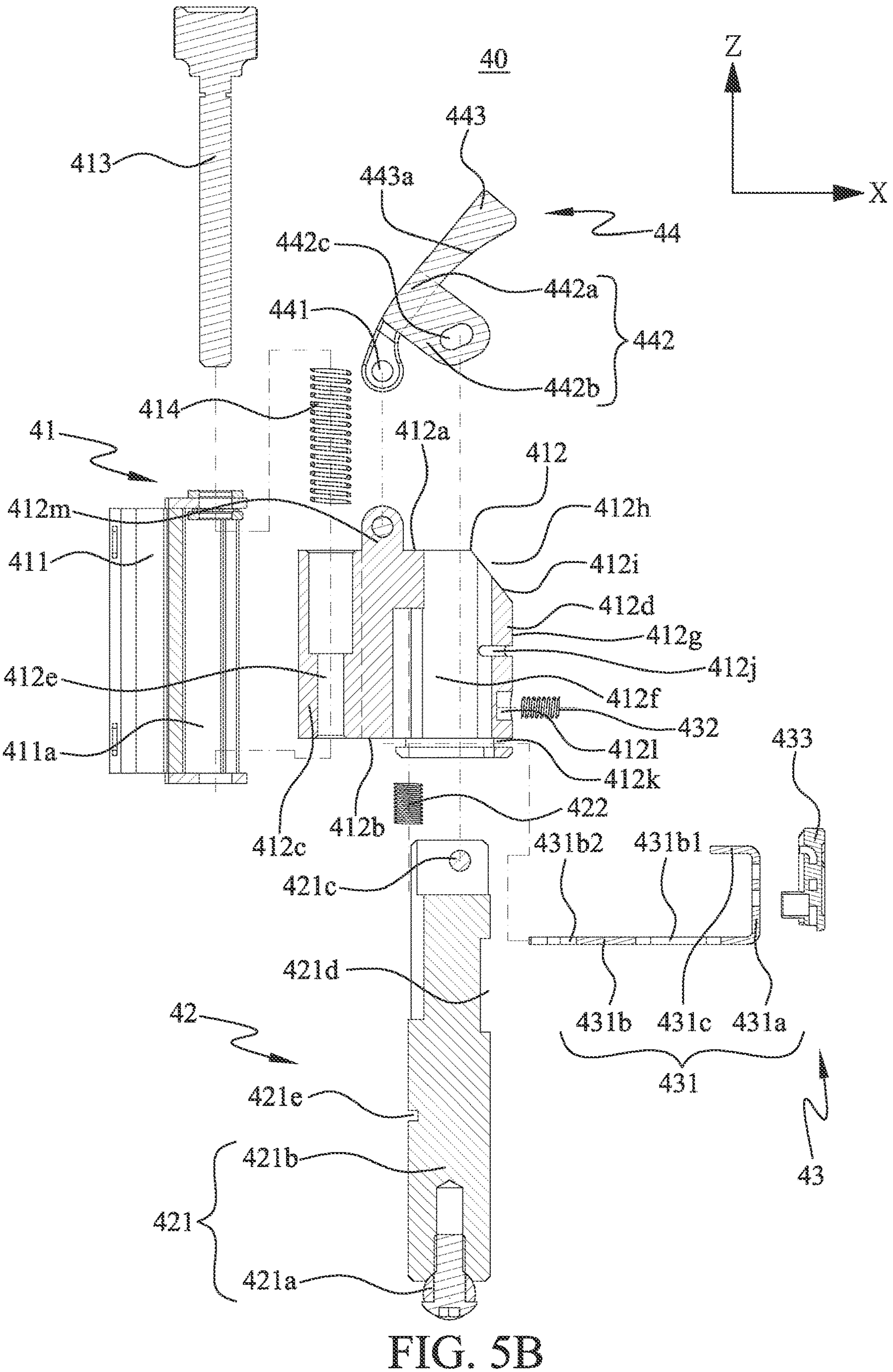
FIG. 5B is an exploded sectional view of a snare on/off mechanism according to another embodiment of the present invention, which includes a pivot block integrally formed with a movable seat.

Please refer to FIGS. 3, 4 and 5A. The snare on/off mechanism 40 is located at a right side of the shell 51 of the snare drum 50 and mainly includes a holding body 41, a sliding assembly 42, a snare on/off assembly 43, and a manual lever 44. In the illustrated preferred embodiment, the holding body 41 includes a fixed seat 411, a movable seat 412, a tension adjusting element 413, and a bearing spring 414. The fixed seat 411 is connected to the shell 51 and formed with a moving space 411*a*. The movable seat 412 includes an upper and a lower side surface, which form an upper pressing surface 412*a* and a lower pressing surface 412*b*, respectively. A portion of the movable seat 412 that is located in the moving space 411*a* is defined as a first movable section 412*c*, while the other portion of the movable seat 412 that is outward protruded beyond the moving space 411*a* is defined as a second movable section 412*d*. As shown in the drawings, the first movable section 412*c* is formed with a threaded hole 412*e*, which is sunken from the upper pressing surface 412*a* toward the lower pressing surface 412*b* and is located in the moving space 411*a*; and the second movable section 412*d* is formed with a sliding bore 412*f*, which is sunken from the upper pressing surface 412*a* toward the lower pressing surface 412*b* and is extended generally parallel to the threaded hole 412*e*. One side of the second movable section 412*d* that is farther away from the shell 51 is defined as a reference side 412*g*, which is located adjacent to both of the upper and the lower pressing surface 412*a*, 412*b*. As shown in FIG. 5A, the second movable section 412*d* is declined from the upper pressing surface 412*a* toward the reference side 412*g*, such that a notch 412*h* communicable with the sliding bore 412*f* is formed, and an area of the second movable section 412*d* corresponding to the notch 412*f* forms a guiding surface 412*i* that is inclined relative to the upper pressing surface 412*a*. Further, the second movable section 412*d* is provided at different positions of the reference side 412*g* with an upper slit 412*j* and a lower slit 412*k*. The upper slit 412*j* is located closer to the notch 412*h* and the lower slit 412*k* is located farther away from the notch 412*h*, and both of them are extended toward the fixed seat 411 in the x-axis direction to penetrate the second movable section 412*d*. The second movable section 412*d* further includes a blind hole 4121, which is located between the upper and the lower slit 412*j*, 412*k* and not communicable with the sliding bore 412*f*. As can be seen in FIG. 5A, a pivot block 412*m* is removably mounted on the movable seat 412 between the threaded hole 412*e* and the sliding bore 412*f* to protrude beyond the upper pressing surface 412*a*. It is understood the description that the pivot block 412*m* is removably mounted on the movable seat 412 is only illustrative. In another embodiment as shown in FIG. 5B, the pivot block 412*m* may be an integral part of the upper pressing surface 412*a* upward extended between the threaded hole 412*e* and the sliding bore 412*f*.

The tension adjusting element 413 of the holding body 41 is extended through the fixed seat 411 of the holding body 41 and the threaded hole 412*e* of the first movable section 412*c* at the same time. In the illustrated preferred embodiment, the tension adjusting element 413 is engaged with the threaded hole 412*e* via screw threads. Thus, when the tension adjusting element 413 is rotated, the movable seat 412 of the holding body 41 is brought to move relative to the fixed seat 411 in the z-axis direction and thereby adjusts the snares 22 to desired tension. As shown, the bearing spring 414 of the holding body 41 is fitted around the tension adjusting element 413 and is located in the moving space 411*a* of the fixed seat 411 with two ends separately pressed against the fixed seat 411 and the first movable section 412*c* of the movable seat 412. Therefore, the bearing spring 414 can push the movable seat 412 downward in the z-axis direction to ensure exact engagement of the threaded hole 412*e* with the tension adjusting element 413 through screw threads. When the tension adjusting element 413 is rotated and brings the movable seat 412 to move, the bearing spring 414 can reduce vibration of the tension adjusting element 413 and the movable seat 412 and accordingly, prevents the tension adjusting element 413 against loosening from the movable seat 412.

The sliding assembly 42 of the snare on/off mechanism 40 includes a slider 421 and a slider spring 422. The slider 421 includes a vertical slider section 421*b* and a horizontally disposed horizontal slider section 421*a* perpendicularly connected to the vertical slider section 421*b*. The horizontal slider section 421*a* is fixedly locked to a lower end of the vertical slider section 421*b*, giving the slider 421 an inverted T-shaped configuration. Further, the horizontal slider section 421*a* is slidably and removably assembled to the right connecting section 212 of the snare protection frame 21. The vertical slider section 421*b* is disposed in the sliding bore 412*f* of the movable seat 412 and is provided at an upper end opposite to the horizontal slider section 421*a* with a protruded pin 421*c*. When the vertical slider section 421*b* slides in the sliding bore 412*f* of the movable seat 412, the horizontal slider section 421*a* is located outside the sliding bore 412*f* to press against the lower pressing surface 412*b* of the holding body 41. As can be seen in FIG. 4, the vertical slider section 421*b* is provided on its outer surface with an upper recess 421*d* and a lower recess 421*e*, which are different in shape. The upper recess 421*d* is located closer to the protruded pin 421*c* and oriented to the upper slit 412*j* of the movable seat 412. The lower recess 421*e* is located closer to the horizontal slider section 421*a* and oriented to the fixed seat 411 of the holding body 41, so that the upper recess 421*d* and the lower recess 421*e* are formed on a right side and a left side of the vertical slider section 421*b*, respectively. Further, the slider spring 422 is disposed in the sliding bore 412*f* with two opposite ends separately pressed against the second movable section 412*d* of the movable seat 412 and the vertical slider section 421*b* of the slider 421. With these arrangements, when the bearing spring 414 is pushed downward in the z-axis direction, it also pushes the slider 421 to move downward.

The snare on/off assembly 43 of the snare on/off mechanism 40 includes a switch member 431 and a switch spring 432. The switch member 431 includes a push section 431*a*, a latch section 431*b* horizontally extended from a lower end of the push section 431*a*, and a locating section 431*c* horizontally extended from an upper end of the push section 431*a* in a direction parallel to the latch section 431*b*. The push section 431*a* has a push button 433 connected thereto. The latch section 431*b* is formed at different locations with a first opening 431*b*1, which is located closer to the push section 431*a*, and a second opening 431*b*2, which is located farther away from the push section 431*a*. In the illustrated preferred embodiment, the latch section 431*b* is configured for extending through the lower slit 412*k* of the holding body 41 into the sliding bore 412*f* of the holding body 41 with the vertical slider section 421*b* of the slider 421 extended through the first opening 431*b*1 on the latch section 431*b* and the tension adjusting element 413 extended through the second opening 413*b*2 on the latch section 431*b*. When the latch section 431*b* is extended into the sliding bore 412*f*, the switch member 43 is movable relative to the movable seat 412 in the x-axis direction, such that the locating section 431*c* is movable between the upper slit 412*j* and the sliding bore 412*f* of the holding body 41. Meanwhile, the push section 431*a* is protruded beyond the reference side 412*g* and located at the right side of the holding body 41. The switch spring 432 is located between the second movable section 412*d* of the holding body 41 and the push section 431*a*. A part of the switch spring 432 extends into the blind hole 4121 formed on the second movable section 412*d*, so that the switch spring 432 has an end pressed against an inner end surface of the blind hole 4121 and another end pressed against the push section 431*a*. With these arrangements, the switch spring 432 can normally push the switch member 431 rightward in the x-axis direction.

Figure 8A:
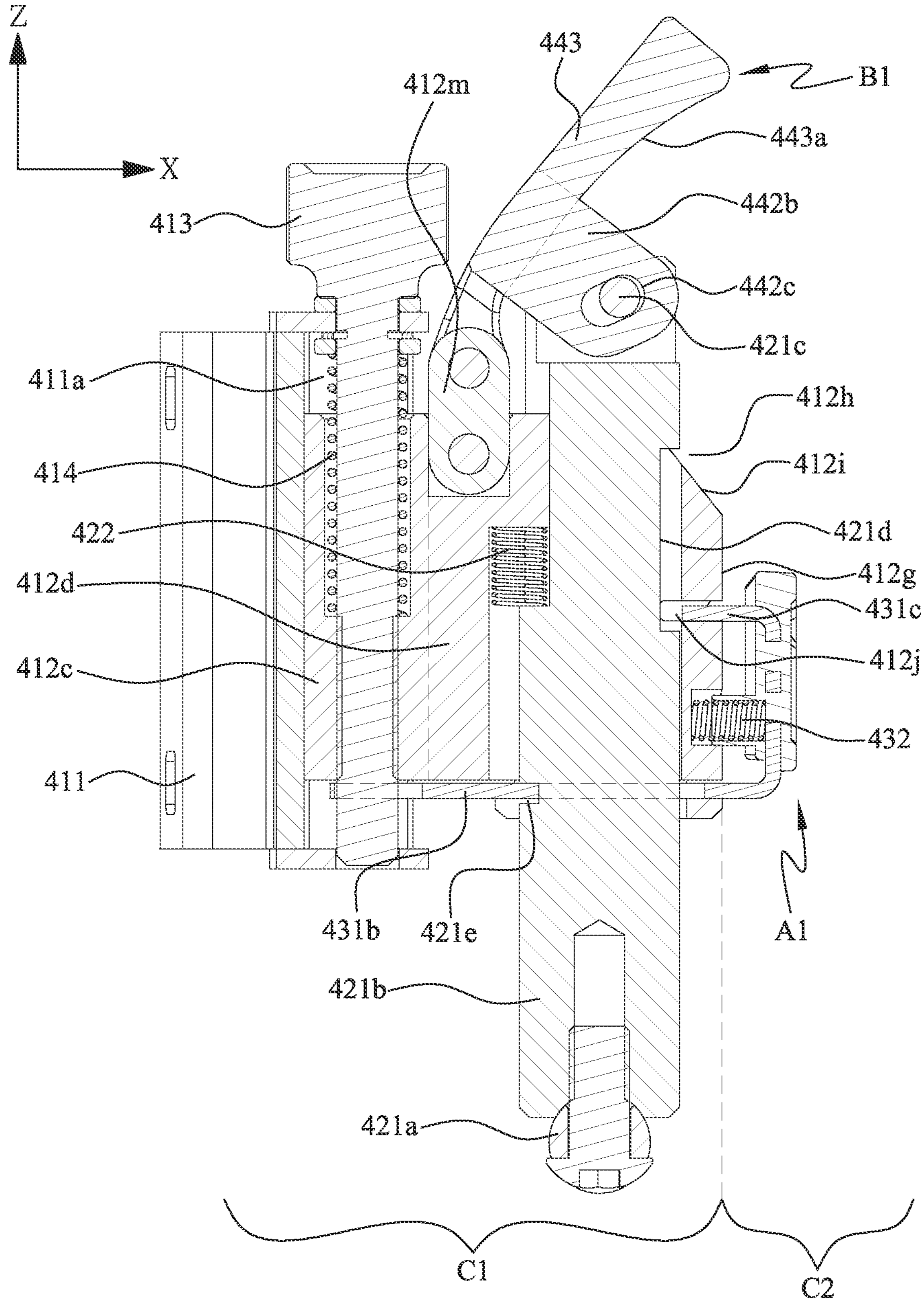
FIG. 8A is a sectional view showing a switch member of the snare on/off mechanism of the present invention is located at a blocking position.
Figure 8B:
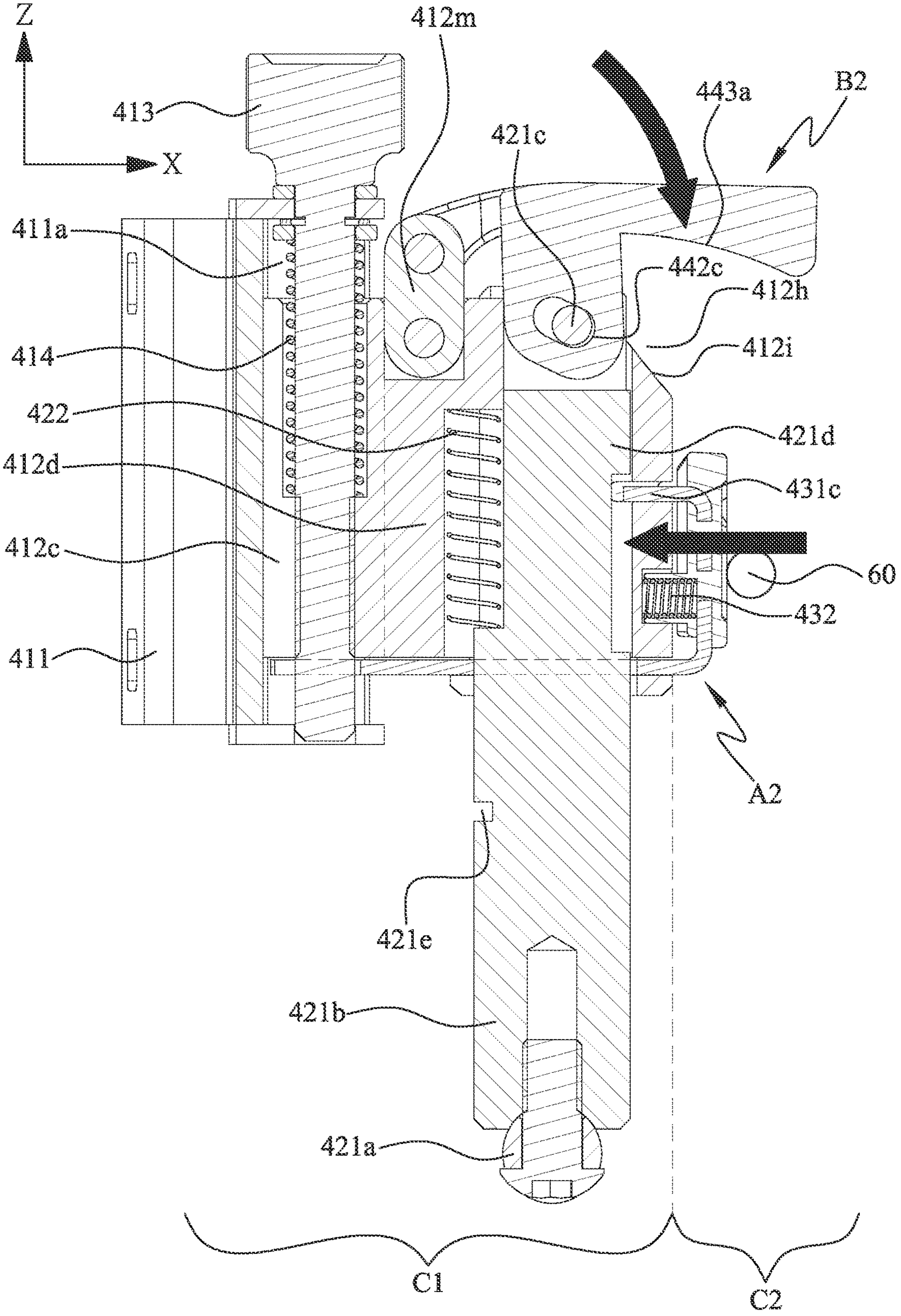
FIG. 8B is a sectional view showing the switch member of FIG. 8A is moved from the blocking position to a releasing position.

The manual lever 44 of the snare on/off mechanism 40 is located above the movable seat 412 and includes a pivot section 441, a coupling section 442 and a lever section 443. The pivot section 441 is pivotally connected to the pivot block 412*m* of the movable seat 412, such that the manual lever 44 is swingable relative the movable seat 412 to be moved to and fro between a snare-on position B1 as shown in FIG. 8A and a snare-off position B2 as shown in FIG. 8B. The coupling section 442 is connected to the vertical slider section 421*b* of the slider 421. More specifically, the coupling section 442 is located between the pivot section 441 and the lever section 443, that is, the pivot section 441 and the lever section 443 are located at two axially opposite sides of the coupling section 442. In the illustrated preferred embodiment, the coupling section 442 is slantingly connected to the pivot section 441 and includes a connecting plate 442*a* and a coupling block 442*b* extended from the connecting plate 442*a*. The connecting plate 442*a* is located outside the sliding bore 412*f* of the holding body 41, while the coupling block 442*b* is located in the sliding bore 412*f*. The coupling block 442*b* has a recessed area that forms a guide portion 442*c*, into which the protruded pin 421*c* of the slider 421 is extended. The lever section 443 is tapered toward the coupling section 442 and accordingly, has a thickness that gradually increases in a direction away from the coupling section 442. Further, one side of the lever section 443 that faces toward the guiding surface 412*i* of the movable seat 412 is formed into a slanted or a curved lever guiding surface 443*a*.

Figure 6:
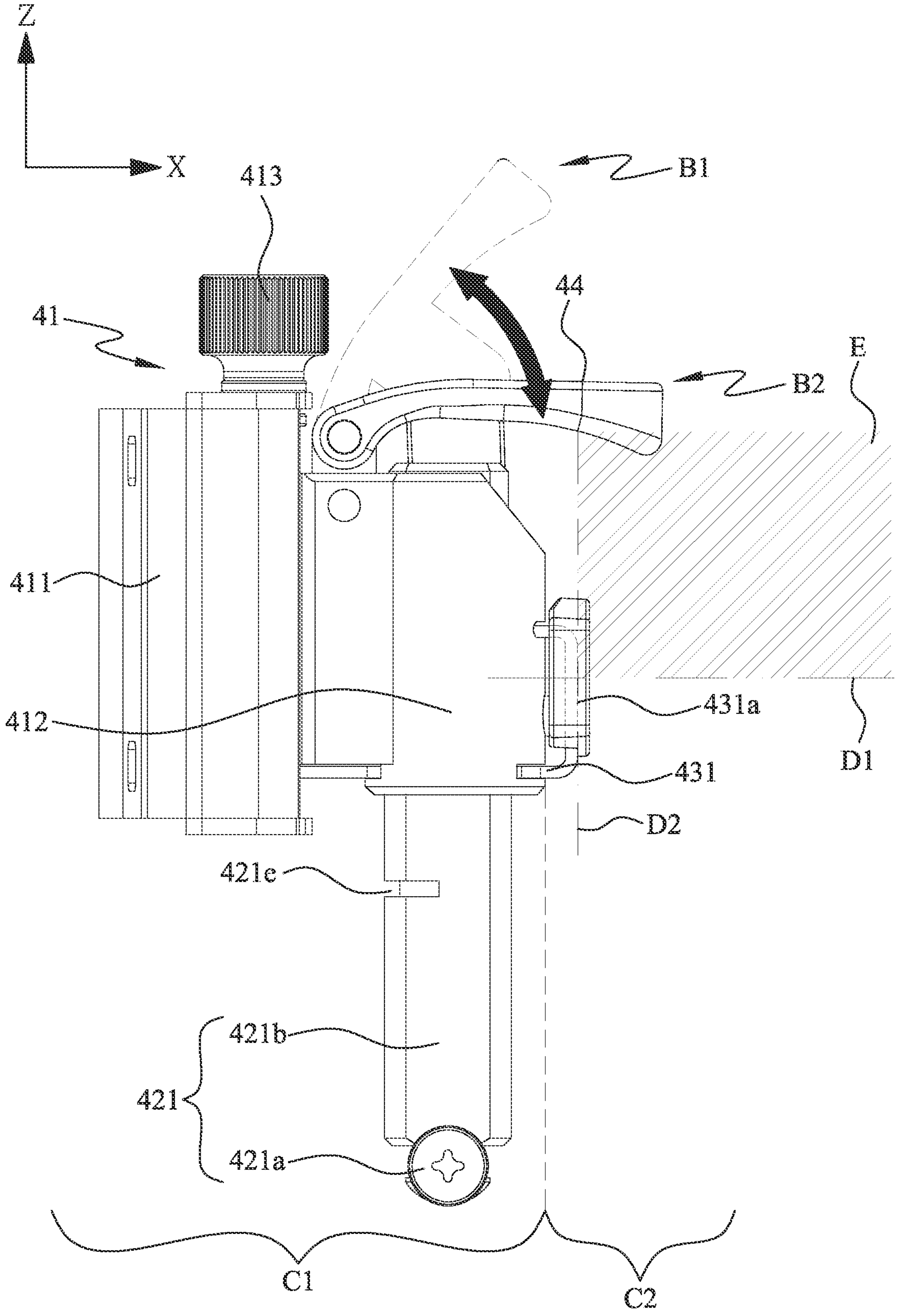
FIG. 6 shows the snare on/off mechanism of the present invention is divided along a reference side into a holding zone and an operating zone.
Figure 7:
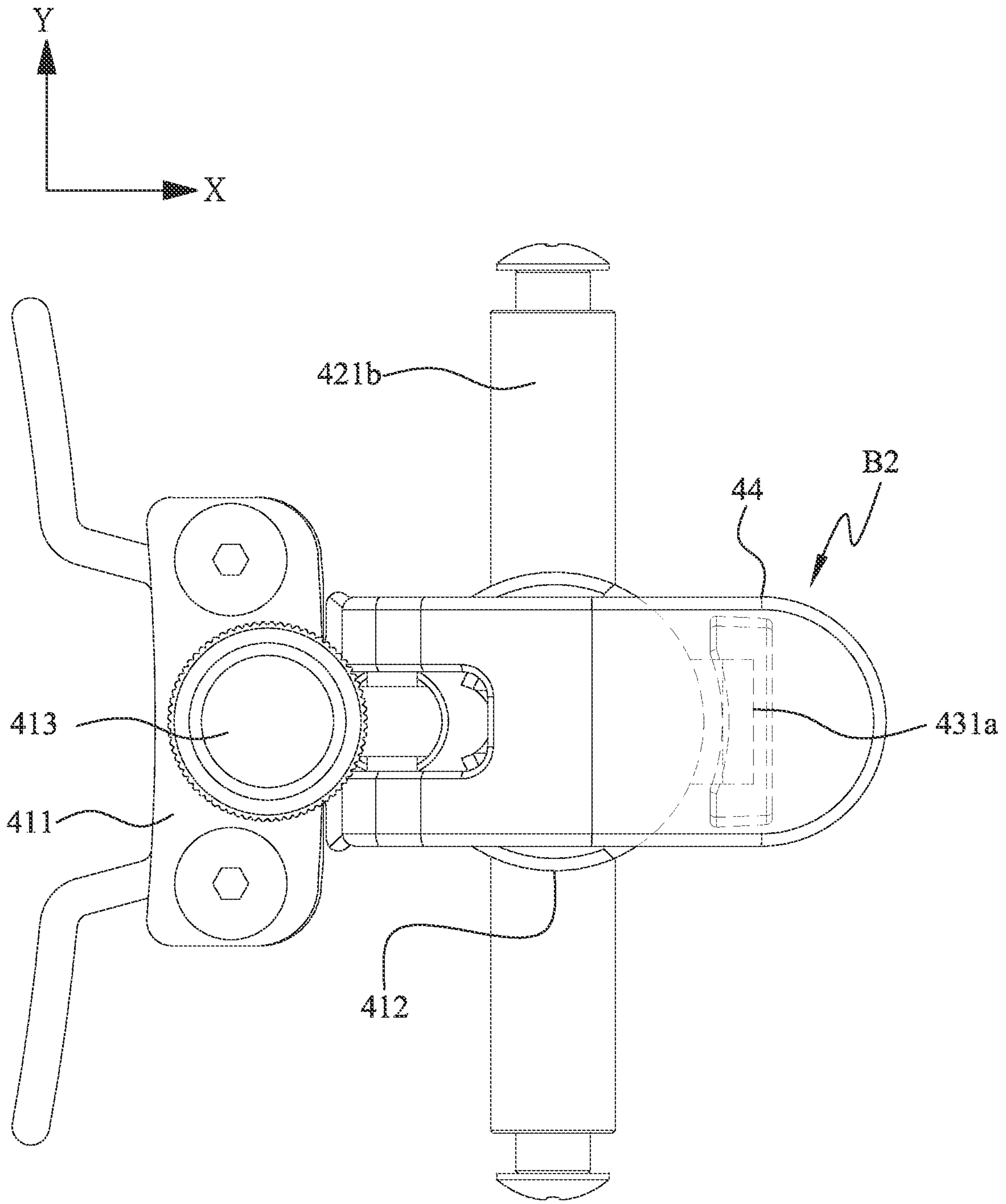
FIG. 7 is a top view showing that a push section is out of sight below a lever section of the snare on/off mechanism of the present invention.

Please refer to FIGS. 6 and 7. The snare adjustment device 2 is divided along the reference side 412*g* into a holding zone C1 and an operating zone C2 located at a right side of the holding zone C1. A line extended horizontally through a center of the push section 431*a* of the switch member 431 in the x-axis direction is defined as a horizontal centerline D1, which is located in the operating zone C2. Another line extended vertically through a center of the lever section 443 of the manual lever 44 in the z-axis direction is defined as a vertical centerline D2, which is a vertical projection located in the operating zone C2. The horizontal centerline D1 intersects with the vertical centerline D2 and both of the horizontal centerline D1 and the vertical centerline line D2 are located in an intersection plane E. Therefore, when viewing downward from a top of the snare on/off mechanism 40 with the manual lever 44 located at the snare-off position B2, the push section 431*a* is out of sight below the lever section 443.

Please refer to FIG. 8A. The switch spring 432 of the snare on/off assembly 43 has an end pushes rightward against the switch member 431 of the snare on/off assembly 43, such that the switch member 431 is located at a blocking position A1 and a part of the latch section 431*b* of the switch member 431 is engaged with the lower recess 421*e* of the vertical slider section 421*b* to stop the slider 421 of the sliding assembly 42 from moving relative to the holding body 41. Further, when the switch member 431 is located at the blocking position A1, the protruded pin 421*c* of the slider 421 is protruded into the sliding bore 412*f* of the holding body 41 to hold the manual lever 44 to the snare-on position B1. At this point, every snare 22 of the snare mechanism 20 is pulled into a tightened state. Also, when the manual lever 44 is located at the snare-on position B1, the coupling block 442*b* of the manual lever 44 is located in the notch 412*h* and the connecting plate 442*a* of the manual lever 44 is located outside the sliding bore 412*f*. In the illustrated preferred embodiment, when the manual lever 44 is in the snare-on position B1, a part of the lever section 443 of the manual lever 44 is protruded beyond the reference side 412*g* of the holding body 41, such that the protruded part of the lever section 443 and the push section 431*a* of the switch member 431 are located in the operating zone C2. More specifically, both the protruded part of the lever section 443 and the push section 431*a* of the switch member 431 are located at the right side of the holding body 41; and the holding body 41, the sliding assembly 42, the latch section 431*b* of the switch member 431, the locating section 431*c* of the switch member 431, the coupling section 442 of the manual lever 44, the pivot section 441 of the manual lever 44, and the portion of the lever section 433 other than that protruded part thereof all are located in the holding zone C2.

Please refer to FIG. 8B. When a snare drum player uses a drum stick 60 to hit the switch member 431 of the snare on/off assembly 43 for the switch member 431 to move leftward from the blocking position A1 to a releasing position A2, the push section 431*a* of the switch member 431 drives the latch section 431*b* of the switch member 431 to move at the same time, so that the latch section 431*b* is released from the lower recess 421*e* of the vertical slider section 421*b*. Meanwhile, the locating section 431*c* of the switch member 431 is moved from the upper slit 412*j* of the holding body 41 into the upper recess 421*d* of the slider 421. As soon as the latch section 431*b* is released from the lower recess 421*e*, the slider spring 422 of the sliding assembly 42 pushes the slider 421 of the sliding assembly 42 downward to change a position of the locating section 431*c* relative to the upper recess 421*d*, and the slider 421 in downward sliding brings the manual lever 44 to swing clockwise from the snare-on position B1 while the coupling block 442*b* of the coupling section 442 slides from the notch 412*h* into the sliding bore 412*f*. When an upper end surface of the upper recess 421*d* is in contact with the locating section 431*c*, the manual lever 44 has swung to the snare-off position B2, and every snare 22 of the snare mechanism is changed from the tightened state to a loosened state. In the illustrated preferred embodiment, when the manual lever 44 is swinging toward the snare-off position B2, the protruded pin 421*c* of the sliding assembly 42 also moves in the guide portion 442*c* of the manual lever 44. Further, when the manual lever 44 is located at the snare-off position B2, the push section 431*a* of the switch member 431 and the entire lever section 443 are located in the operating zone C2, while the holding body 41, the sliding assembly 42, the latch section 431*b* of the switch member 431, the locating section 431*c* of the switch member 431, the coupling section 442 of the manual lever 44, and the pivot section 441 of the manual lever 44 all are located in the holding zone C1.

Figure 8C:
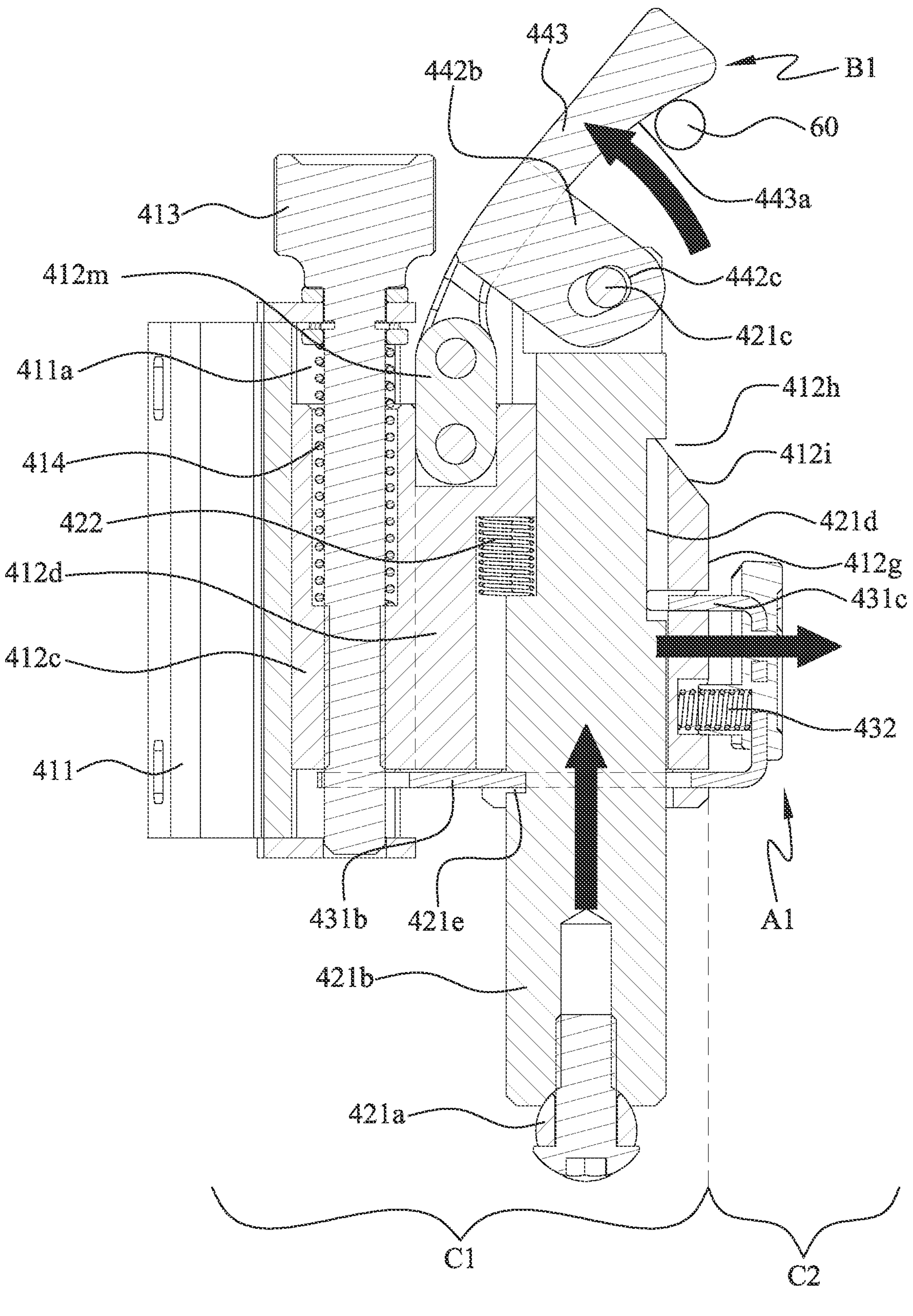
FIG. 8C is a sectional view showing a manual lever of the snare on/off mechanism of the present invention is swung to move a slider for the switch member to move from the releasing position back to the blocking position.

Please refer to FIG. 8C. When the snare drum player needs to change the snares 22 from the loosened state into the tightened state while he is battering the snare drum 50 with the drum stick 60, he needs only to move the drum stick 60 in the z-axis direction to touch the lever guiding surface 443*a* of the manual lever 44. Since the lever section 443 of the manual lever 44 has an inward tapered configuration, the drum stick 60 in contact with the lever guiding surface 443*a* is guided by the latter to move toward the coupling block 442*b* of the manual lever 44 without undesirably separating from the lever guiding surface 443*a*. When the drum stick 60 is moving along the lever guiding surface 443*a*, the manual lever 44 also swings counterclockwise from the snare-off position B2 to the snare-on position B1. This brings the slider 421 of the sliding assembly 42 to move upward in the z-axis direction relative to the holding body 41 and the protruded pin 421*c* of the sliding assembly 42 also moves in the guide portion 442*c* of the manual lever 44. In the illustrated preferred embodiment, since the pivot section 441 of the manual lever 44 is slantingly connected to the coupling section 442 of the manual lever 44, the coupling section 442 is prevented from contacting with the tension adjusting element 413 in the process of swinging to the snare-on position B1. As can be seen in FIG. 8C, the slider 421 keeps moving upward until the lower recess 421*e* of the vertical slider section 421*b* is aligned with the latch section 431*b* of the switch member 431. At this point, the switch spring 432 of the snare on/off assembly 43 pushes the switch member 431 to move rightward from the releasing position A2 to the blocking position A1, such that a part of the latch section 431*b* of the switch member 431 is engaged with the lower recess 421*e* of the vertical slider section 421*b* to stop the slider 421 of the sliding assembly 42 from moving relative to the holding body 41.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A snare adjustment device for snare drum, comprising:
a snare mechanism including a snare protection frame and a plurality of snares respectively having two ends connected to the snare protection frame; and
a snare on/off mechanism including:
a holding body being connected to a shell of the snare drum; and one side of the holding body located farther away from the shell being defined as a reference side;
a slider being connected to the snare protection frame while being slidably connected to the holding body, such that the slider and the snares are movable relative to the holding body synchronously; and
a switch member including a latch section capable of stopping the slider from moving and a push section protruded beyond the reference side of the holding body for driving the latch section to move between a blocking position and a releasing position; the latch section in the blocking position being engaged with the slider to stop the slider from moving relative to the holding body; and the latch section in the releasing position being disengaged from the blocking position to release the slider and allow the slider to move relative to the holding body; and
a manual lever including a coupling section connected to the slider, and a lever section and a pivot section separately extended from two axially opposite sides of the coupling section; the lever section being protruded beyond the reference side, such that both the lever section and the push section are located at the same side of the holding body; the pivot section being pivotally connected to the holding body, allowing the manual lever to be swung relative to the holding body; and the slider being movable along with the manual lever when the manual lever is swung relative to the holding body.

2. The snare adjustment device for snare drum as claimed in claim 1, wherein the holding body is formed with a sliding bore for accommodating the slider, and a notch communicable with the sliding bore and located corresponding to the coupling section of the manual lever, such that a part of the coupling section is movable between the sliding bore and the notch when the manual lever is swung.

3. The snare adjustment device for snare drum as claimed in claim 2, wherein an area of the holding body corresponding to the notch forms a guiding surface and the lever section is tapered toward the coupling section, such that one side of the lever section facing toward the guiding surface on the holding body is formed into a lever guiding surface.

4. The snare adjustment device for snare drum as claimed in claim 1, wherein a guide portion and a protruded pin extended into the guide portion are provided between the coupling section and the slider; and the protruded pin being movable in the guide portion when the lever section is swung relative to the holding body.

5. The snare adjustment device for snare drum as claimed in claim 1, wherein the snare on/off mechanism is divided along the reference side into a holding zone and an operating zone; the holding body, the slider, the latch section of the switch member, the coupling section of the manual lever, and the pivot section of the manual lever all being located in the holding zone; and the push section of the switch member and the lever section of the manual lever being located in the operating zone.

6. The snare adjustment device for snare drum as claimed in claim 1, wherein a line extended horizontally through a center of the push section is defined as a horizontal centerline and a line extended vertically through a center of the lever section is defined as a vertical centerline; and the horizontal centerline and the vertical centerline intersecting with each other to define an intersection plane, such that the push section is out of sight below the lever section when viewing downward from a top of the snare on/off mechanism.

7. The snare adjustment device for snare drum as claimed in claim 1, wherein the holding body includes a fixed seat connected to the shell of the snare drum, a movable seat connected to the slider, and a tension adjusting element is provided between the fixed seat and the movable seat for moving the movable seat axially relative to the fixed seat, so that the tension of the snares are capable of adjustment by the tension adjusting element; and the pivot section being slantingly connected to the coupling section, such that the coupling section is prevented from contacting with the tension adjusting element when the manual lever is being swung.

* * * * *